United States Patent [19]

Rhudy et al.

[11] 3,726,342

[45] Apr. 10, 1973

[54] METHOD OF POLYMER FLOODING

[75] Inventors: John S. Rhudy; Gerald W. Haws, both of Denver, Colo.

[73] Assignee: Marathon Oil Company, Findlay, Ohio

[22] Filed: Mar. 24, 1971

[21] Appl. No.: 127,483

[52] U.S. Cl. .................................................166/275
[51] Int. Cl. ..............................................E21b 43/22
[58] Field of Search.....................166/275, 274, 273, 166/268, 305 R; 252/8.55 D

[56] References Cited

UNITED STATES PATENTS

| | | | |
|---|---|---|---|
| 3,039,529 | 6/1962 | McKennon | 166/275 |
| 3,371,714 | 3/1968 | Katzer | 166/275 X |
| 3,180,410 | 4/1965 | Turbak | 166/275 |
| 2,827,964 | 3/1958 | Sandiford et al. | 166/275 X |
| 3,305,016 | 2/1967 | Lindblom et al. | 166/246 |
| 3,406,754 | 10/1968 | Gogarty | 166/273 |

Primary Examiner—Stephen J. Novosad
Attorney—Joseph C. Herring, Richard C. Willson, Jr. and Jack L. Hummel

[57] ABSTRACT

Polymer flooding to increase production of formation fluids from a subterranean oil-bearing reservoir of low permeability, utilizing a polymer of a specified average molecular weight with at least 5 percent by weight having an average molecular weight at least 1.2 times greater than this specified average molecular weight is improved by mechanically or physically degrading the polymer solution. This substantially decreases the tendency of the polymer solution to "plug" the formation, while only slightly decreasing its viscosity.

12 Claims, 2 Drawing Figures

POLYMER VISCOSITY AND SCREEN FACTOR DEGRADATION IN A "VIRTIS" HOMOGENIZER AT VARIOUS SPEEDS

POLYMER VISCOSITY AND SCREEN FACTOR DEGRADATION AT VARIOUS FLOW RATES THROUGH A 0.06" D. CAPILLARY TUBE

METHOD OF POLYMER FLOODING

BACKGROUND OF THE INVENTION

1. Field of the Invention

This invention relates to the secondary and tertiary recovery of oil from a subterranean oil-bearing reservoir having at least one injection means in fluid communication with at least one production means. More particularly, it relates to an improved method of polymer flooding.

2. Description of the Prior Art

Secondary and tertiary recovery of oil by injection of an aqueous flooding medium into a subterranean oil-bearing formation through an injection well which is in fluid communication with a producing well is a well-known process. The incorporation of a viscosity-increasing agent within the front portion of a waterflood provides a favorable viscosity condition, resulting in less fingering and improved oil recovery. The front portion of the waterflood preferably has a mobility which is equal to or slightly less than the mobility of the crude oil or formation fluids.

U.S. Pat. No. 2,827,964 to Sandiford teaches a secondary recovery process in which a viscous aqueous solution of a water-soluble partially hydrolyzed acrylamide polymer is injected into an injection well and forced through the formation toward a production well.

U.S. Pat. No. 3,039,529 to McKennon teaches that about 100 to about 5,000 ppm of a high molecular weight partially hydrolyzed polyacrylamide is useful to improve waterflooding for recovering crude oil from a subterranean oil-bearing formation.

U.S. Pat. No. 2,771,138 to Beeson teaches a waterflooding method wherein mobility reducing agents, such as naturally occurring gums and polymers; aqueous solutions containing synthetic polymers, e.g., copolymers of methyl vinyl ether and maleic anhydride, condensation products of fatty acids and hydroxy amines, sodium polyacrylide, polyacrylic acid, sodium polymethyl acrylate, etc.; sucrose and crude sugar, etc., are useful to recover crude oil from subterranean oil-bearing formations.

U.S. Pat. No. 3,282,337 to Pye teaches a waterflooding process which employs dilute and comparatively non-viscous aqueous solutions of certain water soluble polymers.

Preferable mobility reducing agents are high molecular weight polymers. However, the utilization of these high molecular weight polymers in a subterranean oil-bearing formation of low permeability often creates a serious plugging problem. As a result, much of the reservoir oil is by-passed by the waterflood and/or a substantial decrease in injectivity index is realized.

SUMMARY OF THE INVENTION

Applicants have discovered that improved oil recovery can be realized in the flooding of subterranean oil-bearing reservoirs of low permeability by mechanically or physically degrading the polymer solution prior to flooding. This mechanical or physical degradation causes a substantial decrease in the screen factor of the polymer solution, while only slightly reducing its viscosity. The tendency of the polymer solution to plug the formation is therefore substantially decreased.

DESCRIPTION OF THE INVENTION

Figure 1:
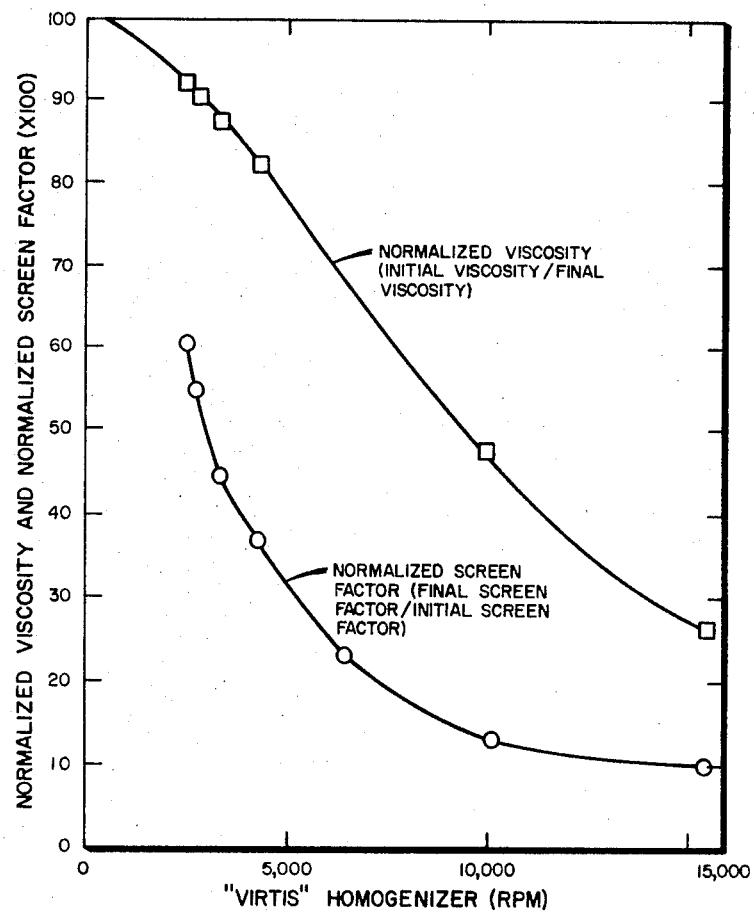
FIG. 1 presents a comparison of the respective decreases of normalized viscosity and normalized screen factor when each is plotted against increasing shear force. This is effected by incrementally increasing the speed of a 1.5 inch blade diameter Virtis "45" homogenizer. The solution consists of distilled water containing 400 ppm of Dow 700 Series Pusher polymer (a partially hydrolized polyacrylamide marketed by Dow Chemical Co., Midland, Michigan). The viscosities are measured on a Brookfield LVT viscometer. The terms normalized screen factor and normalized viscosity are discussed infra, pp. 5 and 6, respectively.

The polymers which can be improved by the mechanical or physical degradation of this invention are those which have an average molecular weight of about 500,000 to about 50,000,000 or more, with at least about 5 percent by weight of the polymer having an average molecular weight at least about 1.2 times greater than the average molecular weight of the overall polymer. Polymers within this molecular weight range may possess a relatively high degree of viscoelasticity.

Specific examples of polymers which can be improved by this invention include high molecular weight polyelectrolytes, specifically high molecular weight polyacrylamides and partially hydrolyzed products thereof, sulfonated high molecular weight polymers, chemically modified polymers such as CMC (carboxy methyl cellulose), polysaccharides, and like polymers. A preferred mobility reducing agent is the "Pusher" polymer sold by Dow Chemical Company, Midland, Michigan.

The term "degradation" as used herein is intended to mean the actual cracking or shearing of those molecules which have molecular weights greater than about 1.2 times the average molecular weight of the polymer.

Mechanical or physical means of degradation are apparatus or processes, respectively, which impart high shear forces to the polymer. These high shear forces actually crack or shear those molecules which comprise the upper, about 5 percent by weight, molecular weight range of the polymer. Examples of apparatus useful for shearing include high pressure pumps, mechanical mixers, homogenizers, etc. An example of a physical means of shearing is a piping arrangement, with possibly undersized pipes, characterized by numerous bends and/or valves. Physical parameters such as temperature, pressure, flow rate, etc., are, of course, intrinsically related to these degradation means. The degradation can take place within the wellbore, i.e. before the polymer enters the reservoir. However, the polymer is preferably degraded prior to its introduction into the wellbore.

The term "screen factor" as used herein is defined as the ratio of polymer flow time to water flow time through an apparatus which provides gravity flow across stainless steel screen(s) of a predetermined mesh. Screen factor relates to the degree of plugging of reservoir formations by polymer flow because it is sensitive to changes in molecular weight and structure. (See R. R. Jennings et al., *Factors Influencing Mobility Control by Polymer Solution*, SPE 2867, p. 162, May 14–15, 1970, for a more detailed description of this term.) The term "normalized screen factor" as used herein is defined as the quotient of the screen factor of the polymer solution after degradation divided by the screen factor of the polymer solution before degradation.

The mechanism of the plugging is possibly a combination of actual retention of a very small amount of the polymer within the porous medium and the use of a relatively high viscoelastic polymer. Irrespective of the mechanism, however, it is asserted that most of the plugging occurs as a result of that component of the polymer which represents the greatest molecular weight.

An important aspect of this invention is that the polymer, after being subjected to the mechanical or physical degradation, exhibits a substantially lower screen factor with only a slight decrease in viscosity. Therefore, the polymer maintains its desirable flooding properties, while dismissing its undesirable plugging characteristics.

EXAMPLE I

Samples A, B, and C are prepared by adding 1,000 ppm of Dow 530 Pusher polymer (partially hydrolized polyacrylamide) to fresh water (about 500 ppm total dissolved solids). The screen factor of sample A is determined via a screen viscometer, described by Jennings et al. (supra). About 15 pore volumes of Sample A is then injected into a reservoir core plug about 1 inch in diameter by about 3 inches long. The core is effectively divided into front and rear sections by locating a pressure tap about 1 inch from the injection face. The absolute permeability of the core sample to water is measured before and after the injection of the polymer solution. A plugging factor, termed "permeability reduction factor", is then calculated by dividing the permeability of the core before polymer injection by the permeability of the core after polymer injection.

Samples B and C are handled in the same manner as Sample A, however, prior to core injection, they are degraded for about 2 minutes in a Virtis "45" homogenizer (blade diameter = 1.5 inches; this is essentially a blade type mixer) run at about 2,500 rpm. Viscosities are measured before and after the degradation on a Brookfield LVT viscometer equipped with a U/L adaptor, running at 6 rpm (which corresponds to a shear rate of 8 sec$^{-1}$). These viscosities are reported as "normalized" by dividing the "after" viscosity by the "before" viscosity.

The results of these samples are reported in Table I.

TABLE I

| Sample | Normalized Viscosity (dimensionless) | Screen Factor | Core Permeability to Water (md) | | | | Permeability Reduction | |
|---|---|---|---|---|---|---|---|---|
| | | | Before Polymer Injection | | After Polymer Injection | | | |
| | | | Front | Rear | Front | Rear | Front | Rear |
| A | 1 | 19.8 | 7 | 22 | 0.1 | 0.4 | 87 | 53 |
| B | 0.92 | 13.7 | 7 | 20 | 0.3 | 0.4 | 30 | 46 |
| C | 0.91 | 10.3 | 12 | 15 | 1.5 | 0.9 | 8 | 16 |

The results indicate a reduction in screen factor of about 0.31 to 0.48, with a corresponding reduction in viscosity of only about 0.08. With respect to permeability reduction the differences between degraded Samples B and C and undegraded Sample A clearly show a major improvement in the plugging of polymer flooding on core samples.

EXAMPLE II

This example compares the normalized screen factor reduction to the corresponding reduction in normalized viscosity. A solution of distilled water containing 400 ppm Dow 700 Series Pusher polymer (a partially hydrolyzed polyacrylamide) is degraded for 2 minutes in a Virtis "45" homogenizer at various incremental speeds. The screen factors and viscosities are measured in the same manner as Example I for each speed. The results, graphically illustrated in FIG. 1, indicate the screen factor is reduced considerably more, e.g., at least 35 percent, than the corresponding viscosities.

EXAMPLE III

Figure 2:
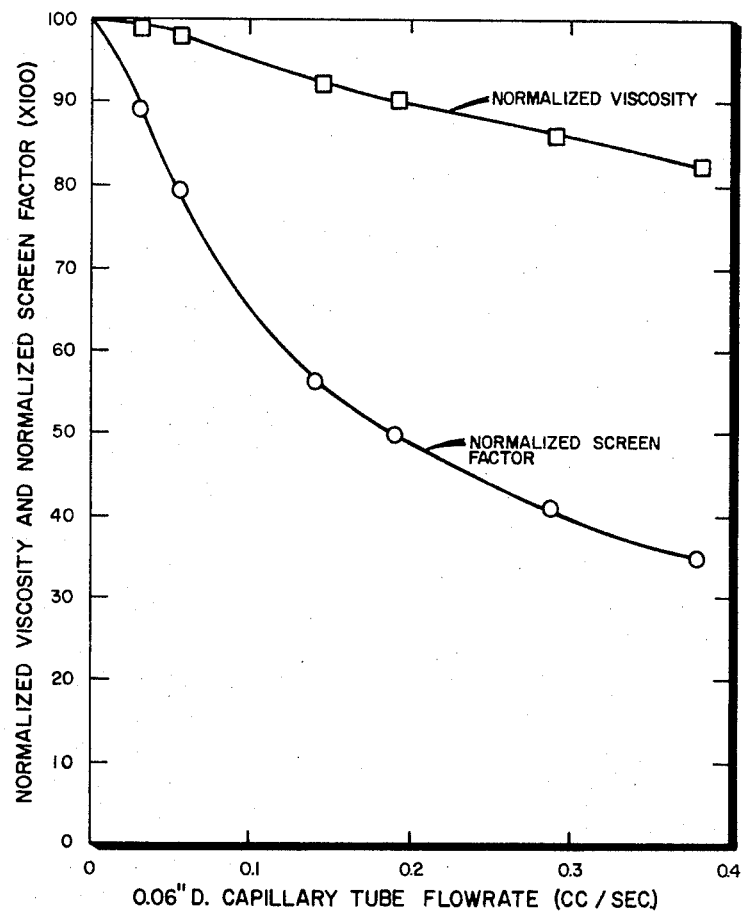
FIG. 2 presents a comparison similar to FIG. 1 in all respects except the means of degradation. For this illustration the polymer solution was degraded by flowing it through a 0.06 inch diameter capillary tube 4.96 cm in length.

The same process followed in Example II is followed in this example. However, the solution is degraded by flow through a 0.06 inch diameter capillary tube 4.96 inches long at various flow rates. The results, graphically illustrated in FIG. 2, again indicate an average reduction in screen factor which is considerably more, e.g., at least 40 percent, than the corresponding reductions in viscosity.

It should be understood that the invention is capable of a variety of modifications which will be made apparent to those skilled in the art by a reading of the specification and which are to be included within the spirit of the claims appended thereto.

What is claimed is:

1. In a process for recovering crude oil from a subterranean oil-bearing reservoir having at least one injection means in fluid communication with at least one production means and wherein an aqueous solution of a high molecular weight polymer is injected into the formation to facilitate the flow of crude oil toward a production means and wherein the polymer has a predetermined average molecular weight with at least 5 percent by weight of the polymer having an average molecular weight at least about 1.2 times greater than the average molecular weight of the total polymer within the aqueous solution and wherein the at least 5 percent portion contributes significantly to reducing the permeability of the subterranean oil-bearing formation, the improvement comprising subjecting the polymer solution to sufficient shear force to shear substantially all of the at least 5 percent portion of the polymer, thereby reducing the average molecular weight of the at least 5 percent portion of the polymer and thereafter injecting the polymer into the reservoir, the overall effect being to inhibit the tendency of the polymer to substantially reduce the permeability of the reservoir.

2. The process of claim 1 wherein the high molecular weight polymer has a molecular weight of from about 500,000 to about 50,000,000.

3. The process of claim 1 wherein the subterranean oil-bearing reservoir is characterized as having an average permeability of about 5 to about 200 millidarcies.

4. The process of claim 1 wherein the high molecular weight polymer is characterized as being viscoelastic.

5. The process of claim 1 wherein the polymer is a partially hydrolyzed, high molecular weight polyacrylamide.

6. The process of claim 1 wherein the polymer is sheared prior to its introduction into the injection means.

7. In a process for recovering crude oil from a subterranean oil-bearing reservoir having at least one injection means in fluid communication with at least one production means and wherein an aqueous solution of a high molecular weight polymer is injected into the formation to facilitate the flow of crude oil toward a production means and wherein the polymer has a predetermined average molecular weight with at least 5 percent by weight of the polymer having an average molecular weight at least about 1.2 times greater than the average molecular weight of the total polymer within the aqueous solution and wherein at least the 5 percent portion contributes significantly to reducing the permeability of the subterranean oil-bearing reservoir, the improvement comprising subjecting the polymer solution to sufficient shear force to substantially reduce the screen factor of the polymer while only slightly reducing the average molecular weight of the polymer, the overall effect being to reduce the tendency of the polymer to reduce the permeability of the reservoir.

8. The process of claim 7 wherein the high molecular weight polymer has a molecular weight from about 500,000 to about 50,000,000.

9. The process of claim 7 wherein the subterranean oil-bearing reservoir is characterized as having an average permeability of about 5 to about 200 millidarcies.

10. The process of claim 7 wherein the high molecular weight polymer is characterized as being viscoelastic.

11. The process of claim 7 wherein the polymer is a partially hydrolyzed, high molecular weight polyacrylamide.

12. The process of claim 7 wherein the polymer is sheared prior to its introduction into the injection means.

* * * * *